(12) United States Patent
Song et al.

(10) Patent No.: US 8,773,828 B2
(45) Date of Patent: Jul. 8, 2014

(54) BUSBAR DIFFERENTIAL PROTECTION METHOD

(71) Applicants: XJ Group Corporation, Xuchang (CN); State Grid Corporation of China, Beijing (CN)

(72) Inventors: Xiaohui Song, Xuchang (CN); Xing Liu, Xuchang (CN); Yong Wei, Xuchang (CN); Dingguo Wang, Xuchang (CN); Guobin Li, Xuchang (CN)

(73) Assignees: XJ Group Corporation, Henan (CN); State Grid Corporation of China, Beijing (CN)

( * ) Notice: Subject to any disclaimer, the term of this patent is extended or adjusted under 35 U.S.C. 154(b) by 4 days.

(21) Appl. No.: 13/651,482

(22) Filed: Oct. 15, 2012

(65) Prior Publication Data
US 2013/0258536 A1 Oct. 3, 2013

(30) Foreign Application Priority Data

Apr. 1, 2012 (CN) .......................... 2012 1 0095617

(51) Int. Cl.
*H02H 3/00* (2006.01)
*H02H 7/00* (2006.01)

(52) U.S. Cl.
USPC ............................................................ 361/65

(58) Field of Classification Search
USPC ............................................................ 361/65
See application file for complete search history.

(56) References Cited

U.S. PATENT DOCUMENTS

2011/0116290 A1* 5/2011 Boys .............................. 363/65

* cited by examiner

*Primary Examiner* — Dharti Patel

(57) ABSTRACT

The present invention relates to a busbar differential protection method. For each bay, firstly, zero-crossing point of voltage is determined according to sample values of voltage, then the current values are re-sampled on a current fitting curve by using zero-crossing point of voltage as a synchronous signal according to a given sampling time period to get a sample sequence. The sample sequence is comprised of current values of sampling points and sample serial numbers. The sample serial numbers of sampling points at the same time are same for the sample sequence of respective interval. Finally, computing is done to sample sequences of respective intervals, and differential protection is achieved.

3 Claims, 2 Drawing Sheets

BUSBAR DIFFERENTIAL PROTECTION METHOD

CROSS-REFERENCE TO RELATED APPLICATIONS

This application claims the priority benefit of Chinese application no. 201210095617.7, filed on Apr. 1, 2012. The entirety of the above-mentioned patent application is hereby incorporated by reference herein and made a part of specification.

BACKGROUND OF THE INVENTION

1. Field of the Invention

The present invention belongs to relay protection and automation of electrical engineering field, and in particular to a busbar differential protection applicable for various voltage ratings based on a novel method of synchronous sampling and transmission technology.

2. Background of the Invention

A busbar is one of important devices of power plants and substations in electrical power system, playing a role of merging and distributing of electrical power. Its overall length is just dozens or hundreds of meters, but a short circuit fault occurs due to a great amount of connected devices, the complicity of electrical wiring, aging of device insulation, contamination and lightning strike; meantime, man made three phase fault arises because of frequent operations and mis-operations of an operator. Therefore, the short circuit fault of busbars still accounts for a certain percentage in the electrical power system. Furthermore, its property of fault is generally severe, doing a great harm to the electrical power system. In view of this, it is demanded that busbars with 110 kV or higher voltage ratings and important busbars with 35 kV voltage ratings be equipped with busbar differential protection.

Today's normal busbar differential protection home and abroad is to introduce currents on all intervals into a busbar differential protection device, which accomplishes synchronous sampling of analog signals and differential logic judgment. Such method requires access to large amounts of secondary cables. The cables need not only large investments, but also lots of constructions on site, which is hard to be granted in smart substations.

It is noted that, as used in this specification and the appended claims "PT" refers to potential transformer.

As used herein, "OLT" refers to optical line terminal.

As used herein, "EPON" refers to Ethernet Passive Optical Network.

Nowadays in smart substations, GPS synchronous technology is largely used, in which timestamps are added to sampled current and voltage data, in doing so, the differential current on the busbar at the same time is obtained. But the drawback along with this method is obvious, because such busbar differential protection has strong dependency on GPS signals, and it will be out of operation without GPS synchronous signals. At the same time, GPS data will occupy most of the channel resources.

BRIEF SUMMARY OF THE INVENTION

The object of the present invention is to provide a busbar differential protection method based on synchronization of zero-crossing point of voltage for solving the strong dependency of existing busbar differential protection on GPS signals.

In order to achieve the above object, the solution of the present invention is: a busbar differential protection method, characterized in that the method comprises the steps of:

(1). sampling the voltage of a busbar continuously and respectively sampling the currents of all intervals on the busbar synchronously at the meantime;

(2). respectively fitting the sample values of the busbar voltage and current sample values of the respective intervals to get a fitting curve for the voltage of the busbar and fitting curves for the currents of the respective intervals;

(3). determining a zero-crossing point on the fitting curve for the voltage of the busbar; as to the fitting curve for the current of each interval, sampling each fitting curve for the current in turn from the above zero-crossing point of voltage according to a given sample time period, to get a sample sequence of each interval, the sample sequence comprising current sample values of sampling points and the sample serial numbers corresponding to the sampling points, the sample serial numbers of sampling points at the same time being the same for the sample sequences of the respective intervals;

(4). storing the sample sequences of the respective intervals, differentially computing the current values with same sample serial numbers for the sample sequence of respective interval, and conducting a differential protection according to the computation result.

In step (1), the busbars are a same busbar, and the voltage of the busbars is the busbar voltage sampled by a PT cabinet on that busbar.

In step (1), the busbars are two busbars operating in parallel, and the voltage of the busbars is the busbar voltage sampled by a PT cabinet on either busbar.

The sample sequences of respective intervals are sent to an OLT device via an EPON network, sent to a busbar protection device by the OLT device, then stored and computed by the busbar protection device.

Because the voltages sampled in different intervals on the same busbar section are totally same, they have same zero crossing times. Based on this, the present invention makes the current quantity in different intervals synchronize, thus omitting the GPS timing means etc.

For each bay, firstly, zero-crossing point of voltage is determined according to sample values of voltage, then the current values are re-sampled on a current fitting curve by using zero-crossing point of voltage as a synchronous signal according to a given sampling time period to get a sample sequence. The sample sequence is comprised of current values of sampling points and sample serial numbers. The sample serial numbers of sampling points at the same time are same for the sample sequence of respective interval. Finally, computing is done to sample sequences of respective intervals, and differential protection is achieved. Because the time of zero-crossing point of voltage on a same busbar section is same, after re-sampled, current sample values with same sample serial numbers are synchronous for different bays on a same busbar section, and synchronous current sample values can be computed differentially.

Therefore, the method of the present invention omits GPS related devices, reduces the system dependency, and achieves strong stability of protection and reduced cost of devices.

DETAILED DESCRIPTION OF THE INVENTION

The present invention is described in detail below in conjunction with drawings.

Figure 1:
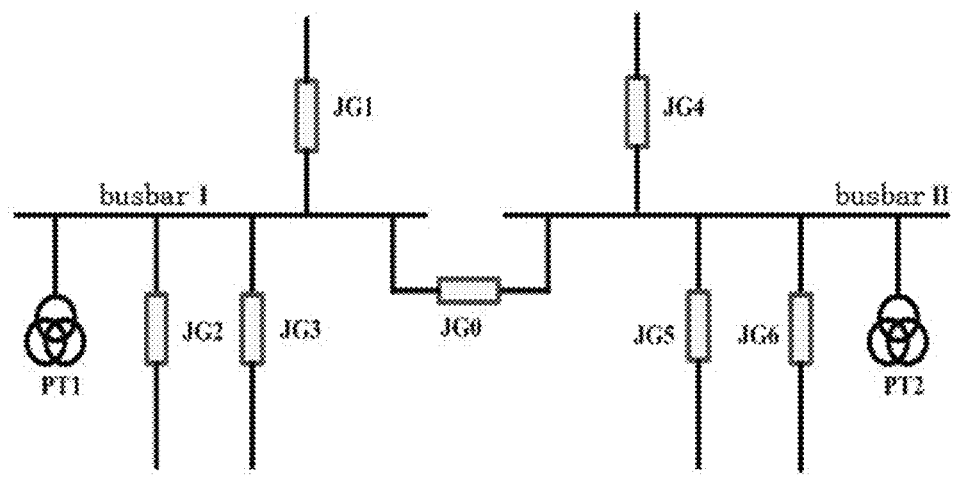
FIG. 1 is a schematic diagram of a busbar connection.

In a single busbar section connection as shown in FIG. 1, except the section interval JG0, there are 6 intervals in total, namely, JG1-JG6, wherein JG1-JG3 belong to the busbar I, JG4-JG6 belong to the busbar II, and PT1 and PT2 belong to the busbars I and II, respectively. When the busbars are in splitting operation, JG1-JG3 sample the voltage of PT1, having common zero-crossing point of voltage, while JG4-JG6 sample the voltage of PT2, having common zero-crossing point of voltage. When the busbars are in parallel operation, JG1-JG6 sample the voltage of the same PT (i.e., PT1 or PT2), having common zero-crossing point of voltage.

If busbar differential protection is performed on the busbar I, voltage samples of the busbar I are obtained by PT1, and the intervals on the busbar I include JG1-JG3. If busbar differential protection is performed on the busbar II, voltage samples of II busbar are obtained by PT2, and the intervals on the busbar II include JG4-JG6. If busbar differential protection is performed on both busbars I and II in parallel operation, voltage samples of busbars are obtained by either PT1 or PT2, and the intervals include JG1-JG6.

No matter how badly voltages fluctuate in one cycle, its zero-crossing point of voltage is definitely specific, and is defined as the transition of sine waveform from negative values to positive values or from positive values to negative values. The zero-crossing point of voltage from negative values to positive values is used in the following embodiments.

Firstly, an initial sampling is performed to sample the busbar voltage and the current of respective interval, and N points are set to be sampled in one cycle.

If N points are sampled in one cycle, N=0, 1, 2, 3 . . . , the sampling time of a sampling point before the zero-crossing point in one voltage cycle is $t(0+k*N)$, the sample value of voltage is $u(0+k*N)$, the sample value of current is $i(0+k*N)$, wherein $k=0, 1, 2, 3 \ldots$, k is the number of cycles. For the next sampling point, the sampling time is $t(1+k*N)$, the sample value of voltage is $u(1+k*N)$, and the sample value of current is $i(1+k*N)$. This is repeated for the Nth sampling point.

Figure 2:
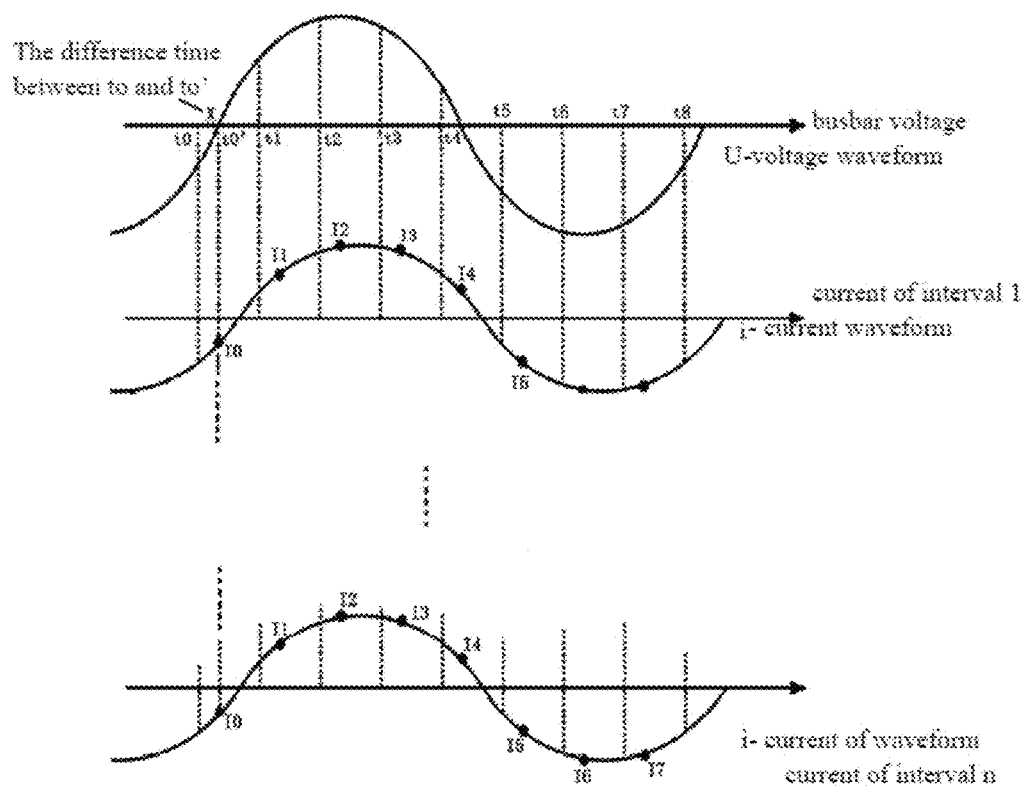
FIG. 2 is a view illustrating the principle of synchronization of zero crossing.

Then fitting is performed on the sample values of busbar voltage and current of respective intervals (1–n, wherein n is the number of bay) respectively to get their fitting curves, as shown in FIG. 2. In FIG. 2, 8 points are sampled in one cycle, the time $t0'$ of zero-crossing point of voltage is get on the linear fitting curve of busbar voltage, and then the corresponding current value $I(0)$ to the zero-crossing point of voltage $t0'$ is get on the current fitting curve of respective intervals, i.e., the sample value of current on current fitting curves, the so-called "re-sample" value. The method for corresponding the voltage fitting curve to the current fitting curve of zero-crossing point of voltage comprises steps of: obtaining the time difference X between $t(0+k*N)$ and $t0'$ on the fitting curve for voltage, and thus positioning $t0'$ on the fitting curves for current, since the time difference between $i(0+k*N)$ and $I(0)$ is also X. As an alternative, it is also possible to obtain the time difference between $t(0+k*N)$ and $t0'$.

After obtaining the re-sample values $I(0)$ of zero-crossing point of voltage, current fitting curve of respective interval is in turn sampled at a chosen time period to respectively solve the sample sequence of respective interval. The sample sequence includes the current sample values of sampling points and the sample serial number corresponding to sampling points. The sample serial numbers of sampling points at the same time are same for the sample sequence of respective interval. As in FIG. 2, the sample sequence of interval 1 is $I(0), I(1), I(N-1) \ldots$, the sample sequence of interval n is $I(0), I(1), \ldots, I(N-1) \ldots$. Because zero-crossing point of voltage on the same busbar section is same, the current sample values with same sample sequence after being re-sampled in different intervals on a same busbar is synchronous, i.e., the current values of same sample serial number for the sample sequence of respective interval are synchronous.

Figures 3, 4:
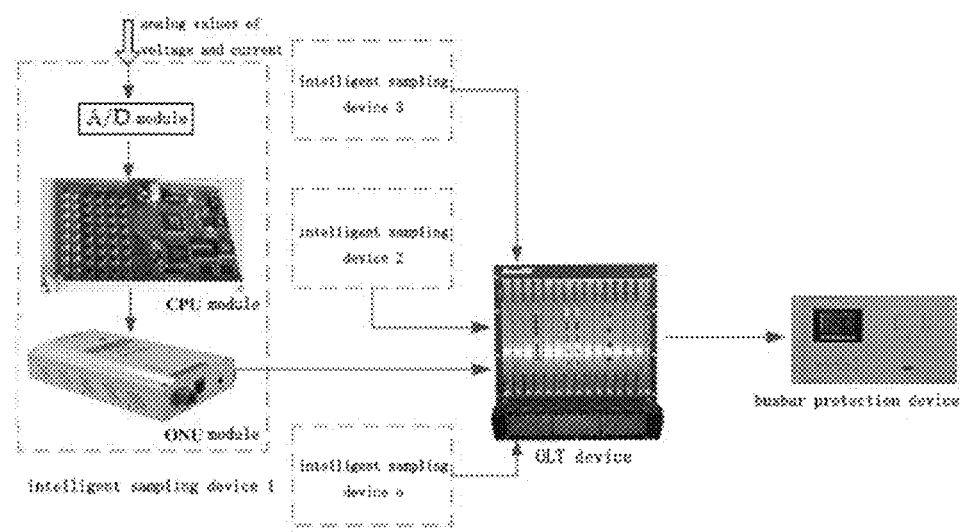
FIG. 3 is a view illustrating the principle of transmission of sampled data.
FIG. 4 is a view illustrating the principle of storing of sampled data.

The sample sequence of respective interval is stored, and the current values with same sample serial number for sample sequence of respective interval are differentially computed, and differential protection is effected as the result of the computation results. As shown in FIG. 3, ONU module is integrated in an intelligent sampling device. The sample data re-sampled by CPU module, along with respective sample serial number, are transmitted to ONU module, and are uploaded by EPON network. Under tests, in the case where 8 ONU modules are connected in a OLT device, the longest transmission delay of ONU module is no longer than 500 microseconds (far less than 20 ms, a period of the current/voltage analog quantity), thereby effectively avoiding the incorrect circumstances of corresponding of timing logic to serial numbers across cycles.

As shown in FIG. 4, the sample data sampled in different intervals on a same busbar sent over an EPON communication network are stored by the busbar protection device according to sample serial number 0–1. In terms of synchronization at zero-crossing point of voltage, the sample data with the same sample serial number is the data at the same time, which can be differentially computed. According to this, the barbus protection device performs various logic computations for differential protection, and correctly exits based on the actual fault.

Because longest transmission delay of ONU module plus transmission delay is no longer than 2 ms, there are two cases of sample serial number received at the same time: 1) the difference between sample serial numbers is small, less than N/4. Take two intervals for example, the sample serial number of interval 1 is 10 at a given time, the sample serial number of interval 2 is only 9 or 11, the difference between sample serial numbers is less than N/4; 2) near the zero-crossing point of voltage, the case where the difference between sample serial numbers is great exists. Take two intervals for example, the sample serial number of interval 1 is 0 at a given time, the sample serial number of interval 2 is possibly the serial number N–1 of last cycle.

Except the above two cases, there are always cases where exceptional data are received due to communication abnormality. Therefore, warning logic of communication abnormality is set in the device, avoiding the case of wrong data storage across cycles. When the difference between sample serial numbers received at the same time is greater than N/4 (N being the sampling points of each cycle) and less than N/2, the busbar protection device sends communication abnormality warning signal and lockouts the differential protection.

What is claimed is:

1. A busbar differential protection method, comprises the steps of:
   (1). sampling the voltage of a busbar continuously and respectively sampling the currents of all intervals on the busbar synchronously at the meantime;

(2). respectively fitting the sample values of the busbar voltage and current sample values of the respective intervals to get a fitting curve for the voltage of the busbar and fitting curves for the currents of the respective intervals;

(3). determining a zero-crossing point on the fitting curve for the voltage of the busbar; as to the fitting curve for the current of each interval, sampling each fitting curve for the current in turn from the above zero-crossing point according to a given sample time period, to get a sample sequence of each interval, said sample sequence comprising current sample values of sampling points and sample serial numbers corresponding to the sampling points; the sample serial numbers of sampling points at the same time being the same for the sample sequences of the respective intervals;

(4). storing the sample sequences of the respective intervals, differentially computing the current values with same sample serial numbers for the sample sequence of respective interval, and conducting a differential protection according to the computation results, characterized in that in said step (1), said busbars are a same busbar, and said voltage of the busbars is the busbar voltage sampled by a potential transformer (PT) cabinet on that busbar.

2. The busbar differential protection method according to claim 1, characterized in that in said step (1), said busbars are two busbars in parallel, and said voltage of the busbars is the busbar voltage sampled by a potential transformer (PT) cabinet on either busbar.

3. The busbar differential protection method according to claim 2, characterized in that the sample sequences of respective intervals are sent to an optical line terminal (OLT) device via an Ethernet Passive Optical Network (EPON), sent to a busbar protection device by the optical line terminal (OLT) device, then stored and computed by the busbar protection device.

* * * * *